(12) United States Patent
Mitarashi

(10) Patent No.: US 8,692,486 B2
(45) Date of Patent: Apr. 8, 2014

(54) DC/DC CONVERTER, CONTROL CIRCUIT THEREOF AND LIGHTING APPARATUS USING THE SAME

(75) Inventor: Mutsumi Mitarashi, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 45 days.

(21) Appl. No.: 13/569,829

(22) Filed: Aug. 8, 2012

(65) Prior Publication Data

US 2013/0038236 A1 Feb. 14, 2013

(30) Foreign Application Priority Data

Aug. 10, 2011 (JP) ................................. 2011-175412

(51) Int. Cl.
*H05B 37/02* (2006.01)

(52) U.S. Cl.
USPC .................... 315/307; 315/209 R; 315/362

(58) Field of Classification Search
USPC ............. 315/209 R–240, 246, 254, 274, 291, 315/297, 307–308, 360, 362
See application file for complete search history.

(56) References Cited

U.S. PATENT DOCUMENTS

| | | | |
|---|---|---|---|
| 7,994,737 B2 * | 8/2011 | Tamegai et al. | 315/307 |
| 8,143,815 B2 * | 3/2012 | Tamegai et al. | 315/307 |
| 2006/0103332 A1 * | 5/2006 | Motomori et al. | 315/308 |
| 2011/0006694 A9 * | 1/2011 | Tamegai et al. | 315/209 R |

FOREIGN PATENT DOCUMENTS

JP 2010-080524 4/2010

* cited by examiner

*Primary Examiner* — Jany Richardson
(74) *Attorney, Agent, or Firm* — Fish & Richardson P.C.

(57) ABSTRACT

A control circuit of a DC/DC converter stabilizing driving a current while supplying a driving voltage to a load comprises a current detection circuit for comparing a current detection signal indicative of a current flowing through a switching transistor of the DC/DC converter with a predetermined threshold to generate an OFF signal, a timer circuit for generating an ON signal that is asserted after a predetermined time period has elapsed since an assertion of the OFF signal, a pulse generation circuit for generating a pulse signal, and a driver for driving the switching transistor based on the pulse signal, where the timer circuit includes a first capacitor, a current source for generating a charging current, an arithmetic circuit for generating a threshold voltage, and an first comparator configured to compare a voltage of the first capacitor and the threshold voltage.

10 Claims, 5 Drawing Sheets

DC/DC CONVERTER, CONTROL CIRCUIT THEREOF AND LIGHTING APPARATUS USING THE SAME

CROSS-REFERENCE TO RELATED APPLICATION

This application is based upon and claims the benefit of priority from Japanese Patent Application No. 2011-175412, filed on Aug. 10, 2011, the entire contents of which are incorporated herein by reference.

TECHNICAL FIELD

The present disclosure relates to a DC/DC converter, which drives a load with a constant current.

BACKGROUND

In recent years, an LED (light-emitting diode) or an organic EL (Electro-Luminescence) element is used as a backlight for a lighting apparatus or a liquid crystal panel. In order for a light-emitting element, such as the LED or organic EL element, to emit light of stable brightness, it is necessary to supply a constant current proportional to the brightness of the emitted light.

For supplying power to such light-emitting elements, a driving circuit with a DC/DC converter (switching regulator) may be utilized. The driving circuit of the related art turns off a switching transistor, when a driving current flowing through the LED reaches a predetermined peak level while the switching transistor is in an ON state. After a predetermined period of time, the switching transistor is turned on again. By repeating this operation, the driving current stabilized at the predetermined level is supplied to the LED.

In such driving circuits, a problem may occur with the operating frequency of the DC/DC converter changing, since on-time of a switching transistor undergoes a lot of changes in response to an input voltage of the DC/DC converter, i.e., power supply voltage. Therefore, when designing a lighting apparatus, there is a need to consider the variation of the operating frequency, which raises the difficulty level of designing such devices.

SUMMARY

According to some embodiments, a control circuit of a DC/DC converter is described capable of stabilizing a driving current while supplying a driving voltage to a load. In view of the challenges described above, the DC/DC converter may be enabled to drive a load with a constant current at a stable frequency.

According to some embodiments, the control circuit includes: a current detection circuit configured to compare a current detection signal associated with a current flowing through a switching transistor of the DC/DC converter with a predetermined threshold to generate an OFF signal that is asserted when the current flowing through the switching transistor reaches a predetermined peak current; a timer circuit configured to generate an ON signal that is asserted after a predetermined time period has elapsed since an assertion of the OFF signal; a pulse generation circuit configured to generate a pulse signal that transitions to a first-level when the ON signal is asserted, and transitions to a second-level when the OFF signal is asserted; and a driver configured to drive the switching transistor based on the pulse signal. The timer circuit may include: a first capacitor having one electrode at a fixed potential; a current source configured to generate a charging current based on an output voltage $V_{OUT}$ of the DC/DC converter so as to charge the first capacitor with the charging current; an arithmetic circuit configured to generate a threshold voltage $V_{C4}$ according to a calculation based on an equation: $V_{C4}=(V_{IN}-V_{OUT})\times V_{OUT}/V_{IN}\times m$, where $V_{IN}$ is an input voltage of the DC/DC converter, $V_{OUT}$ is an output voltage of the DC/DC converter, and m is a constant; and a first comparator configured to compare a voltage of the first capacitor with the threshold voltage $V_{C4}$ so as to generate the ON signal asserted when the voltage of the first capacitor reaches the threshold voltage $V_{C4}$.

According to some embodiments, an off-time of the switching transistor of the DC/DC converter can be adjusted so that a switching cycle is constant regardless of the input voltage and the output voltage of the DC/DC converter.

In some embodiments, the arithmetic circuit may include: a division circuit configured to divide the voltage $(V_{IN}-V_{OUT})/k$ (which corresponds to a difference between the input voltage $V_{IN}$ and the output voltage $V_{OUT}$) by a voltage $V_{IN}/k$ (which corresponds to the input voltage $V_{IN}$), wherein k is a constant; and a multiplier circuit configured to multiply an output voltage of the division circuit and a voltage $V_{OUT}\times m$ corresponding to the output voltage $V_{OUT}$.

In some embodiments, the division circuit may include: a first input terminal configured to receive the voltage $(V_{IN}-V_{OUT})/k$ (which corresponds to the difference between the input voltage $V_{IN}$ and the output voltage $V_{OUT}$) a second input terminal configured to receive the voltage $V_{IN}/k$ (which corresponds to the input voltage $V_{IN}$); a second capacitor, wherein a first electrode of the second capacitor is grounded; a first transistor and a second transistor connected in series between the second input terminal and a ground terminal, the first transistor being a P-channel MOSFET (Metal Oxide Semiconductor Field Effect Transistor) and the second transistor being an N-channel MOSFET; a second resistor arranged between a connection point of the first transistor and the second transistor and a second electrode of the second capacitor; and a second comparator, wherein an inverting input terminal of the second comparator is connected to the first input terminal, a non-inverting input terminal of the second comparator is connected to the second electrode of the second capacitor and an output terminal of the second comparator is connected to a gate of the first transistor and a gate of the second transistor.

According to some embodiments, the multiplier circuit may include a third input terminal configured to receive a voltage from the output terminal of the second comparator of the division circuit; a fourth input terminal configured to receive a voltage corresponding to the output voltage $V_{OUT}$; a third transistor and a fourth transistor connected in series between the fourth input terminal and the ground terminal, the third transistor being a P-channel FET, the fourth transistor being an N-channel FET, a gate of the third transistor being connected to the third input terminal, and a gate of the fourth transistor being connected to the third input terminal; a third capacitor, a first electrode of the third capacitor being grounded; and a third resistor disposed between a connection point of the third transistor and the fourth transistor and the second electrode of the third capacitor.

According to some embodiments, a ripple component is superimposed on an output voltage of the multiplier circuit, i.e., the threshold voltage. The switching period of the DC/DC converter may have a jitter component according to the ripple component of the threshold voltage, thus causing a suitable spectrum spreading.

The arithmetic circuit may further include a smoothing circuit configured to smooth a voltage of the second electrode of the third capacitor of the multiplier circuit. With this configuration, based on a cut-off frequency of the smoothing circuit, an amount of the ripple component of the threshold voltage, i.e., the jitter component of the switching period, can be controlled and the spectrum of the DC/DC converter can be controlled.

In some embodiments, the arithmetic circuit may further include: a first reset terminal to which a first initialization voltage $(V_{IN}-V_{O\_NOM})/k$ corresponding to a difference between the input voltage $V_{IN}$ and a target output voltage $V_{O\_NOM}$ is input; and a first reset transistor disposed between the first reset terminal and the second electrode of the second capacitor. With this configuration, a response speed of the DC/DC converter can be improved.

In some embodiments, the arithmetic circuit may further include: a second reset terminal to which a second initialization voltage is input; and a second reset transistor disposed between the second reset terminal and the second electrode of the third capacitor. With this configuration, a response speed of the DC/DC converter can be improved.

According to some embodiments, the arithmetic circuit may further include a smoothing circuit configured to smooth a voltage of the second electrode of the third capacitor of the multiplier circuit. The smoothing circuit may include: a fourth capacitor, where a first electrode of the fourth capacitor is grounded; and a third reset transistor disposed between a second electrode of the fourth capacitor and the second reset terminal. With this configuration, a response speed of the DC/DC converter can be improved.

In some embodiments, the current source may include a resistor, where one end of the resistor is connected to the first capacitor and the output voltage $V_{OUT}$ is applied to the other end of the resistor.

According to some other embodiments, a DC/DC converter is capable of stabilizing a driving current while supplying a driving voltage to a load. The DC/DC converter includes any of the above-mentioned control circuits.

According to some other embodiments, a lighting apparatus includes: a light-emitting element, and an above-mentioned DC/DC converter configured to stabilize a driving current while supplying a driving voltage to the light-emitting element.

In addition, any combinations of the above-mentioned components, or components or expressions of the present disclosure may be substituted reciprocally among methods, apparatuses, systems or the like, which are also effective as embodiments of the present disclosure.

BRIEF DESCRIPTION OF THE DRAWINGS

The accompanying drawings, which are incorporated in and constitute a part of the specification, illustrate embodiments of the present disclosure, and together with the general description given above and the detailed description of the embodiments given below, serve to explain the principles of the present disclosure.

DETAILED DESCRIPTION

Reference will now be made in detail to various embodiments, examples of which are illustrated in the accompanying drawings. In the following detailed description, numerous specific details are set forth in order to provide a thorough understanding of the inventive aspects of this disclosure. However, it will be apparent to one of ordinary skill in the art that the inventive aspect of this disclosure may be practiced without these specific details. In other instances, well-known methods, procedures, systems, and components have not been described in detail so as not to unnecessarily obscure aspects of the various embodiments.

As used herein, "a state in which a member A is connected with a member B" includes not only a case in which the member A and the member B are directly connected physically, but also a case in which the member A is connected to the member B indirectly via another member which does not substantially affect the electrical connection status of the members A and B or impair functions or effects exerted by coupling the members A and B.

Similarly, "the state in which a member C is provided between a member A and a member B" includes not only a case in which the member C is directly connected with the member A or the member B, but also a case in which the member C is indirectly connected with the member A or the member B via another member which does not substantially affect the electrical connection status of the members A and C or B and C or impair functions or effects exerted by coupling the members A and C or B and C.

Figure 1:
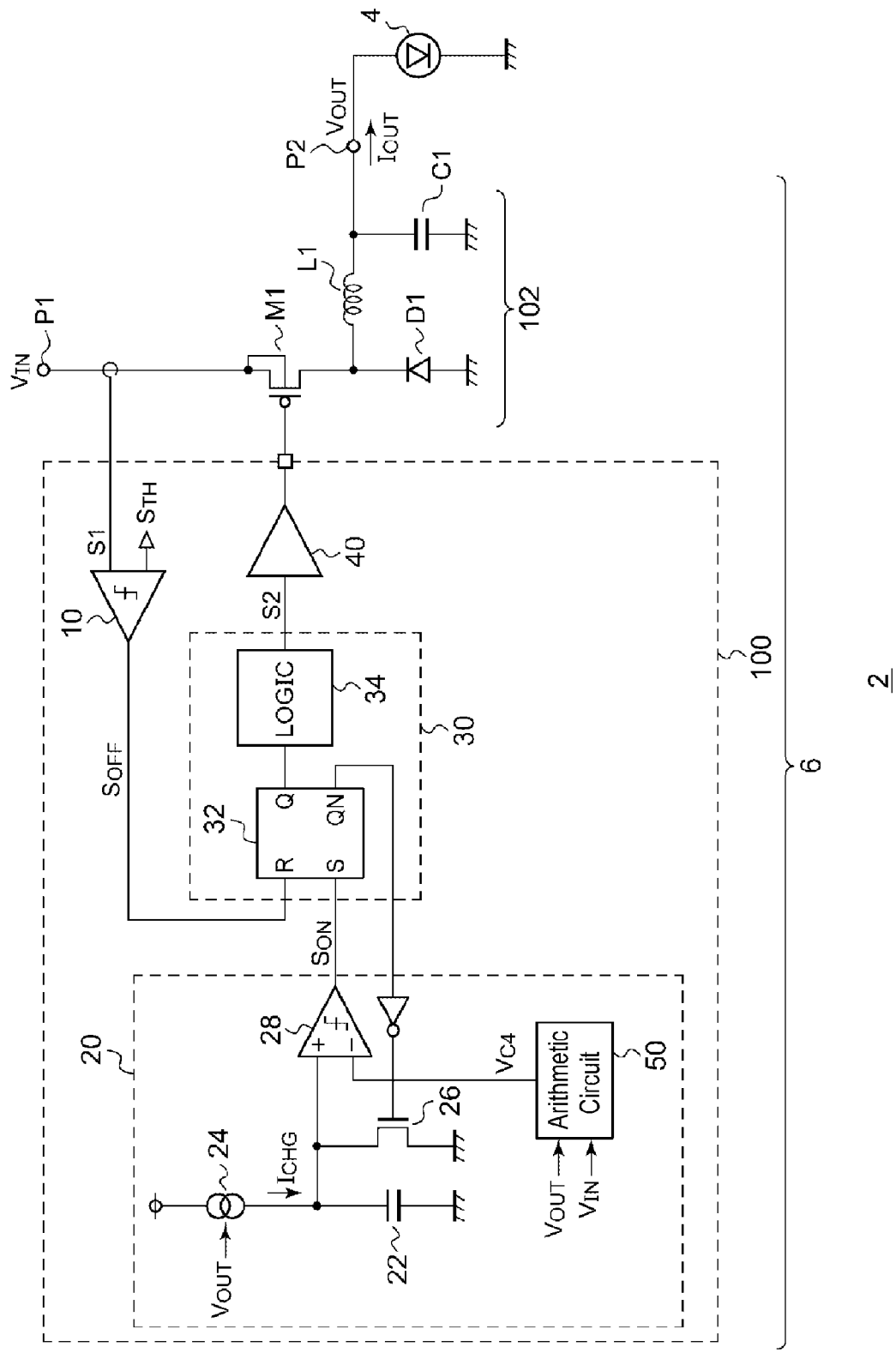
FIG. 1 is a circuit diagram illustrating a configuration of a lighting apparatus, according to some embodiments.

FIG. 1 is a circuit diagram illustrating a configuration of a lighting apparatus 2, according to some embodiments. The lighting apparatus 2 includes a DC/DC converter 6 and a light-emitting element 4, which acts as a load to the DC/DC converter 6. The light-emitting element 4 may be an LED device or an organic EL device, for example, which emits light at a luminance level corresponding to a driving current.

The DC/DC converter 6 operates to generate a constant current, and may utilize a buck switching regulator for stabilizing a driving current (output current) $I_{OUT}$ that flows through the light-emitting element 4 to an amount corresponding to a target luminance. The DC/DC converter 6 receives a DC input voltage $V_{IN}$ at an input terminal P1 and steps down the input voltage $V_{IN}$, to generate a driving voltage (output voltage) $V_{OUT}$ supplied to the light-emitting element 4.

The DC/DC converter 6 includes a control circuit 100 and an output circuit 102. The output circuit 102 includes a switching transistor M1, a rectifying diode D1, an inductor L1, and an output capacitor C1 that are configured to have a DC/DC buck converter topology. It some embodiments, instead of the rectifying diode D1, a synchronous rectifying transistor may be utilized. In such case, the synchronous rectifying transistor switches in a complementary manner with the switching transistor M1.

The control circuit 100 executes a feedback control of a duty ratio of the switching operation of the switching transistor M1 so that an output current $I_{OUT}$ of the DC/DC converter 6 may have a predetermined value.

The control circuit 100 includes a current detection circuit 10, a timer circuit 20, a pulse generation circuit 30, and a driver 40.

The current detection circuit 10 compares a current detection signal S1, indicating a current $I_{M1}$ which flows through the switching transistor M1, with a predetermined threshold value $S_{TH}$ and generates an OFF signal $S_{OFF}$, which is asserted when the current $I_{M1}$ of the switching transistor M1 reaches a predetermined peak current $I_{PEAK}$. In some embodiments, an assertion of each logical signal is assigned to a high level, and a negation of the logical signal is assigned to a low level, although other signal designations may be utilized.

The timer circuit 20 generates an ON signal $S_{ON}$, which is asserted when a predetermined off-time $T_{OFF}$ has elapsed after the assertion of the OFF signal $S_{OFF}$. The pulse generation circuit 30 generates a pulse signal S2 which transitions to a first level (high level, for example) each time the ON signal $S_{ON}$ is asserted and transitions to a second level (low level, for example) each time the OFF signal $S_{OFF}$ is asserted. The pulse generation circuit 30 includes a RS flip-flop 32 and a logic circuit 34. The OFF signal $S_{OFF}$ is input to a reset terminal R of the RS flip-flop 32 and the ON signal $S_{ON}$ is input to a set terminal S of the RS flip-flop 32. An output A of the RS flip-flop 32 transitions to a high level when the ON signal $S_{ON}$ is asserted and transitions to a low level when the OFF signal $S_{OFF}$ is asserted. An inverted output QN of the RS flip-flop 32 takes a logic level complementary to the output Q.

The logic circuit 34 receives the output signal Q of the RS flip-flop 32, and outputs a pulse signal S2. The pulse signal S2 has a level by which the switching transistor M1 is turned on when the output signal Q of the RS flip-flop 32 is at a high level and is turned off when the output signal Q of the RS flip-flop 32 is at a low level. The driver 40 drives the switching transistor M1 based on the pulse signal S2.

The timer circuit 20 includes a first capacitor 22, a current source 24, a discharge switch 26, a first comparator 28, and an arithmetic circuit 50. One electrode of the first capacitor 22 is grounded, and thus its potential is fixed. The first capacitor 22 has a capacitance $C_X$.

The arithmetic circuit 50 generates a threshold voltage $V_{C4}$, which corresponds to the input voltage $V_{IN}$ and the output voltage $V_{OUT}$ of the DC/DC converter 6 and is based on Equation (1):

$$V_{C4}=(V_{IN}-V_{OUT})\times V_{OUT}/V_{IN}\times m \quad (1), \text{where } m \text{ is a constant.}$$

The current source 24 generates a charging current $I_{CHG}$ corresponding to the output voltage $V_{OUT}$ of the DC/DC converter to charge the first capacitor 22 with the charging current $I_{CHG}$. For example, the current source 24 may generate the charging current $I_{CHG}=V_{OUT}/R_X$ substantially proportional to the output voltage $V_{OUT}$. $R_X$ is a constant. A voltage $V_{OFF}$ of the first capacitor 22 after a lapse of time t from the start of charging is given by Equation (2):

$$V_{OFF}=I_{CHG}/C_X\times t=(V_{OUT}/R_X)/C_X\times t \quad (2)$$

The discharge switch 26 is provided in parallel with the first capacitor 22, and is controlled by to the state of the RS flip-flop 32. More specifically, after the OFF signal $S_{OFF}$ is asserted, the discharge switch 26 is turned off, and the timer circuit 20 measures the off time $T_{OFF}$. During a time period other than the time period when the OFF signal $S_{OFF}$ is asserted, the discharge switch 26 is turned on, and the voltage $V_{OFF}$ of the first capacitor 22 is initialized to the ground voltage.

The first comparator 28 compares the voltage $V_{OFF}$ of the first capacitor 22 with the threshold voltage $V_{C4}$ to control the ON signal. For example, the first comparator 28 generates the ON signal $S_{ON}$, which is asserted when the voltage $V_{OFF}$ of the first capacitor 22 exceeds the threshold voltage $V_{C4}$.

Next, a configuration of the control circuit 100 will be described in detail.

Figure 2A:
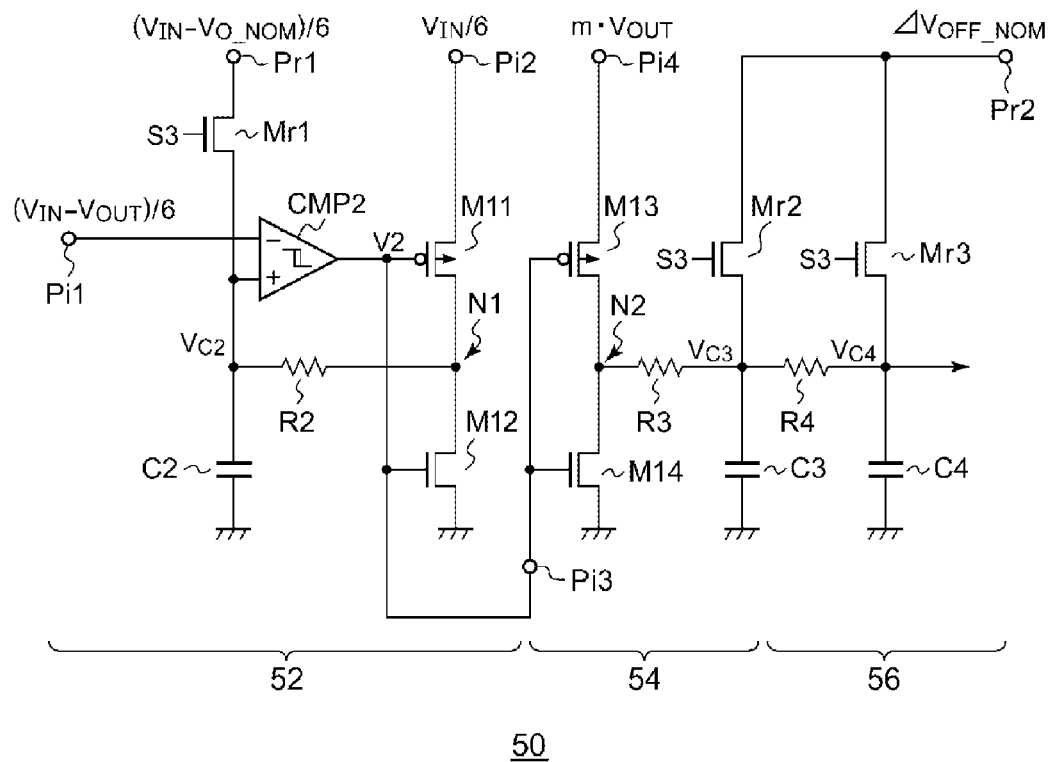
FIGS. 2A to 2C are circuit diagrams illustrating a configuration of an arithmetic circuit of a timer circuit of the lighting apparatus shown in FIG. 1.
Figure 2B:
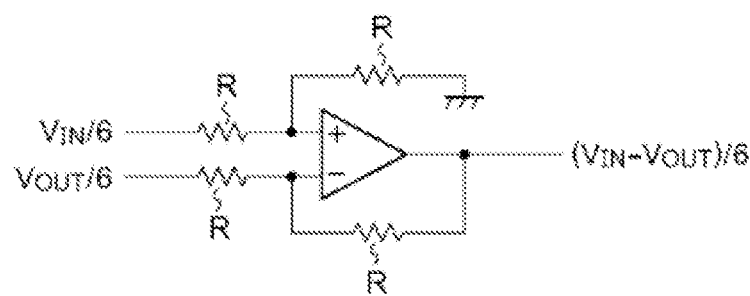
Figure 2C:
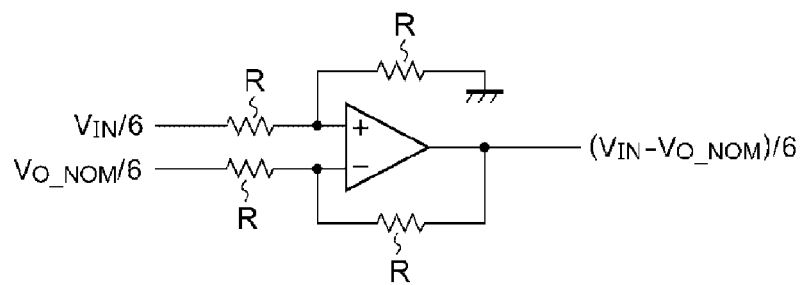

FIGS. 2A to 2C are circuit diagrams for showing an example of the configuration of the arithmetic circuit 50 of the timer circuit 20 in FIG. 1. The arithmetic circuit 50, shown in FIG. 2A, includes a division circuit 52, a multiplication circuit 54, and a smoothing circuit 56.

The division circuit 52 divides a voltage $(V_{IN}-V_{OUT})/k$ (k is a constant) by a voltage $V_{IN}/k$. The voltage $(V_{IN}-V_{OUT})/k$ corresponds to a difference between the input voltage $V_{IN}$ and the output voltage $V_{OUT}$ of the DC/DC converter 6, while the voltage $V_{IN}/k$ corresponds to the input voltage $V_{IN}$. The constant k is appropriately selected for matching, for example, with an operating voltage of the circuit. For illustration purposes, FIGS. 2A to 2C show a case where k=6. In some embodiments, a resistance type voltage division circuit or other circuits (not particularly limited) may be used in multiplying a certain voltage by 1/k.

The division circuit 52 includes a first input terminal Pi1, a second input terminal Pi2, a first reset terminal Pr1, a second capacitor C2, a first transistor M11, a second transistor M12, a second resistor R2, a second comparator CMP2, and a first reset transistor Mr1. The voltage $(V_{IN}-V_{OUT})/k$ corresponding to the difference between the input voltage $V_{IN}$ and the output voltage $V_{OUT}$ is input to the first input terminal Pi1. The voltage $(V_{IN}-V_{OUT})/k$ may be generated, for example, by an analog subtractor using the operational amplifier shown in FIG. 2B. The voltage $V_{IN}/k$ corresponding to the input voltage $V_{IN}$ is input to the second input terminal Pi2.

A first electrode of the second capacitor C2 is grounded. The first transistor M11 and the second transistor M12 are connected in series between the second input terminal Pi2 and the ground terminal. For example, the first transistor M11 may be a P-channel MOSFET (Metal Oxide Semiconductor Field Effect Transistor), and the second transistor M12 may be an N-channel MOSFET transistor is the first MOSFET. The gate of the first transistor M11 and the gate of the second transistors M12 are connected in common.

The second resistor R2 is provided between a second electrode of the second capacitor C2 and a connection point N1 of the first transistor M11 and the second transistor M12. The second comparator CMP2 may be a hysteresis comparator in which an inverting input terminal (−) is connected with the first input terminal Pi1 and a non-inverting input terminal (+) is connected with the second electrode of the second capacitor C2. The second comparator CMP2 compares the voltage $(V_{IN}-V_{OUT})/k$ with the voltage $V_{C2}$ of the second capacitor C2. The output terminal of the second comparator CMP2 is connected to a gate of the first transistor M11 and a gate of the second transistor M12. When the output V2 of the second comparator CMP2 is at a low level, the first transistor M11 is turned on and the second capacitor C2 is charged. When the output V2 of the second comparator CMP2 is at a high level, the second transistor M12 is turned on and the second capacitor C2 is discharged.

The first reset transistor Mr1 is provided between the second electrode of the second capacitor C2 and the first reset terminal Pr1. An initialization voltage $(V_{IN}-V_{O\_NOM})/k$ corresponding to a difference between the input voltage $V_{IN}$ and a target value $V_{O\_NOM}$ of the output voltage is input to the first reset terminal Pr1. The initialization voltage is generated, for example, by an analog subtractor shown in FIG. 2C.

The output V2 of the second comparator CMP2 alternates between a high level and a low level, and the second capacitor C2 is charged or discharged according to the output V2 of the second comparator CMP2. At a steady state, charging charge and discharging charge for the second capacitor C2 are balanced with each other, and the voltage $V_{C2}$ of the second capacitor C2 fluctuates around a certain average voltage $V_{C2AVG}$.

When a cycle period of the output of the second comparator CMP2 is T and a period during which the output is at a low level is $T_0$, Equation (3) is established:

$$(V_{IN}/k - V_{C2AVG})T_0/R^2 = V_{C2AVG}(T-T_0)/R2 \qquad (3)$$

Then, by solving Equation (3) for $V_{C2AVG}$, Equation (4) is obtained:

$$V_{C2AVG} = V_{in}/k \cdot (T_0/T) \qquad (4)$$

The average voltage $V_{C2AVG}$ of the voltage $V_{C2}$ of the second capacitor C2 can be approximated as equal to the other input voltage $(V_{IN} - V_{OUT})/k$ of the second comparator CMP2. Then, Equation (5) is obtained:

$$V_{C2AVG} = V_{IN}/k \cdot T_0/T = (V_{IN} - V_{OUT})/k$$

$$T_0/T = (V_{IN} - V_{OUT})/V_{IN} \qquad (5)$$

The duty ratio of the output signal of the second comparator CMP2 has a value corresponding to $(V_{IN} - V_{OUT})/V_{IN}$. The division circuit 52 outputs the output voltage V2 of the second comparator CMP2.

One problem of a division circuit may be that the switching regulator may require fast response. In such case, if the charge of the second capacitor C2 is fully discharged, in case where the circuit is shut down or temporarily stops, a delay may be caused until the voltage of the second capacitor C2 is charged or charging. In order to prevent the delay, the division circuit 52 in FIG. 2A includes, in its configuration, the first reset transistor Mr1.

A reset signal S3 is input to the gate of the first reset transistor Mr1. During the operation of the DC/DC converter 6, the reset signal S3 is negated and the first reset transistor Mr1 is turned off. The first reset transistor Mr1 is turned on when the reset signal S3 is asserted. By asserting the reset signal S3 when the DC/DC converter 6 starts or resumes its operation, the voltage $V_{C2}$ of the second capacitor C2 is initialized by the initialization voltage $(V_{IN} - V_{O\_NOM})/k$. By turning the first reset transistor Mr1 on, the voltage $V_{C2}$ of the second capacitor C2 can approach a steady-state level promptly, and the response speed of the DC/DC converter 6 can be improved.

The multiplication circuit 54 multiplies the output voltage V2 of the division circuit 52 by a voltage $V_{OUT} \times m$ corresponding to the output voltage $V_{OUT}$. The multiplication circuit 54 includes a third input terminal Pi3, a fourth input terminal Pi4, a third transistor M13, a fourth transistor M14, a third resistor R3, a third capacitor C3, and a second reset transistor Mr2.

The output voltage V2 of the division circuit 52 is input to the third input terminal Pi3. The voltage $V_{OUT} \times m$ corresponding to the output voltage $V_{OUT}$ is input to the fourth input terminal Pi4. The third transistor M13 and the fourth transistor M14 are connected in series between the fourth input terminal Pi4 and the ground terminal. The gate of each of the third transistor M13 and the fourth transistor M14 is connected with the third input terminal Pi3, where the output voltage V2 of the division circuit 52 is applied.

A first electrode of the third capacitor C3 3 is grounded. The third resistor R3 is provided between a second electrode of the third capacitor C3 and a connection point N2 of the third transistor M13 and the fourth transistor M14.

The output voltage V2 of the second comparator CMP2 output from the division circuit 52 as described above alternates between high and low levels. The third transistor M13 is turned on and the third capacitor C3 is charged, when the voltage V2 is at a low level, and the fourth transistor M14 is turned on and the third capacitor C3 is discharged, when the voltage V2 is at a high level. At a steady state, charging charge and discharging charge for the third capacitor C3 are balanced with each other, and the voltage $V_{C3}$ of the third capacitor C3 fluctuates around a certain average voltage $V_{C3AVG}$.

When a cycle of the output V2 of the second comparator CMP2 is T and a period during which the output is at low level is $T_0$, Equation (6) is established:

$$(m \cdot V_{OUT} - V_{C3AVG})T_0/R3 = V_{C3AVG}(T-T_0)/R3 \qquad (6)$$

By solving Equation (6) for $V_{C3AVG}$, Equation (7) is obtained:

$$V_{C3AVG} = m \cdot V_{OUT} \cdot (T_0/T) \qquad (7)$$

By applying Equation (5) to Equation (7), Equation (8) is obtained to compute a voltage $V_{C3AVG}$:

$$V_{C3AVG} = (V_{IN} - V_{OUT})/V_{IN} \times m \times V_{OUT} \qquad (8).$$

The multiplication circuit 54 outputs a voltage $V_{C3}$ of the second electrode of the third capacitor C3.

An initialization voltage $\Delta V_{OFF\_NOM}$ is applied to the second reset terminal Pr2. The second reset transistor Mr2 is provided between the second reset terminal Pr2 and the third capacitor C3 so as to initialize the voltage $V_{C3}$ of capacitor C3. When the reset signal S3 is asserted, the voltage $V_{C3}$ of the third capacitor C3 is initialized.

Ripples are superimposed on the voltage $V_{C3}$ of the third capacitor C3 given by Equation (8). The smoothing circuit 56 is provided to remove the ripples of the voltage $V_{C3}$.

The output voltage $V_{C3}$ of the multiplication circuit 54 is smoothed out by the smoothing circuit 56. The smoothing circuit 56 may be an RC filter which includes a fourth resistor R4 and a fourth capacitor C4. Further, the smoothing circuit 56 may include a third reset transistor Mr3 provided between the second reset terminal Pr2 and the fourth capacitor C4. When the reset signal S3 is asserted, the voltage $V_{C4}$ of the fourth capacitor C4 is initialized.

With the arithmetic circuit 50 described above, it is possible to generate the threshold voltage $V_{C4}$ of Equation (1).

Figure 3:
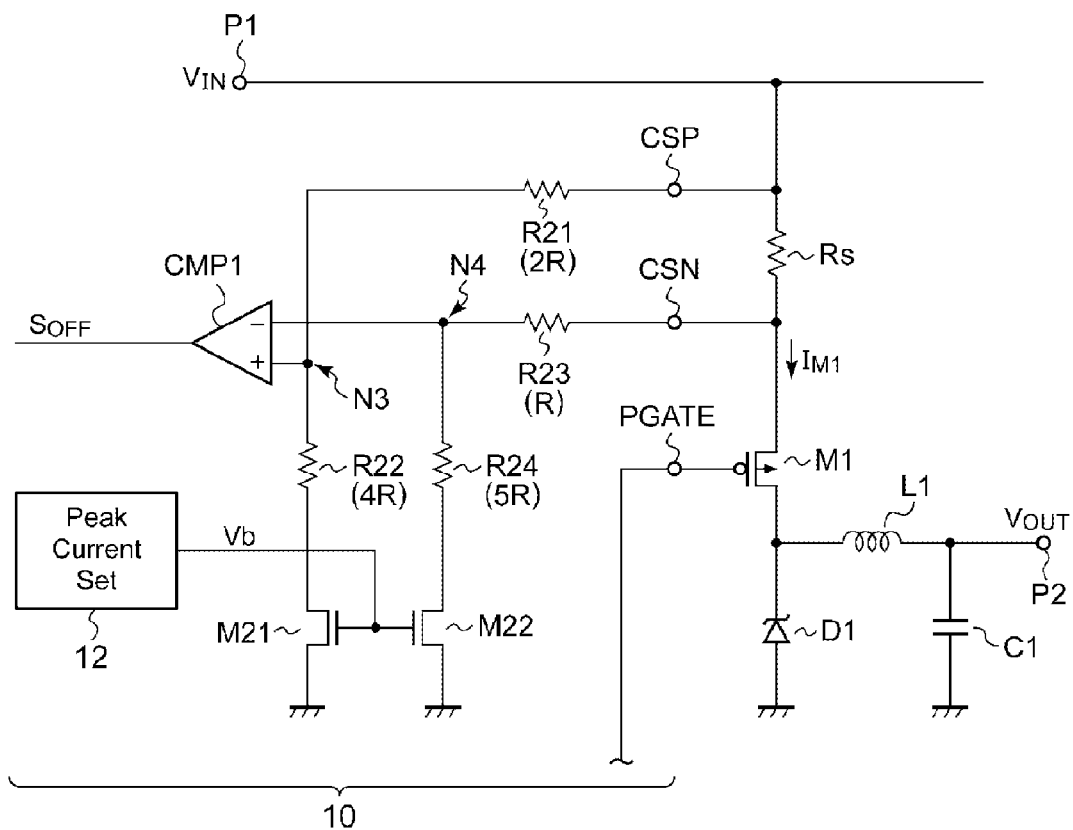
FIG. 3 is, a circuit diagram illustrating a configuration of a current detection circuit of the lighting apparatus shown in FIG. 1.

Next, a configuration of the current detection circuit 10 is explained. FIG. 3 is a circuit diagram showing an example of the configuration of the current detection circuit shown in FIG. 1. The current detection circuit 10 includes a detection resistor Rs, resistors R21 to R24, transistors M21 and M22, a comparator CMP1, and a peak current setting unit 12.

One end of the detection resistor Rs is connected with a current detection terminal CSP of the control circuit 100, and the other end of the detection resistor Rs is connected with a current detection terminal CSN of the control circuit 100. Resistors R21 and R22 and the transistor M21 are connected in series between the detection terminal CSP and the ground terminal. Resistors R23 and R24 and the transistor M22 are connected in series between the detection terminal CSN and the ground terminal. FIG. 3 shows the ratio of resistance values of the resistors R21 to R24 in parentheses.

A gate of the transistor M21 and a gate of the transistor M22 are commonly-connected to each other, and sources of transistors M21 and M22 are also commonly-connected to each other. Therefore, the transistors M21 and M22 constitute a so-called current mirror circuit. The peak current setting unit 12 applies to the gates of the transistors M21 and M22 a bias voltage Vb corresponding to a target peak value of the current $I_{M1}$ flowing through the switching transistor M1. An identical current Ic corresponding to the bias voltage Vb flows through each of the transistor M21 and M22.

The comparator CMP1 compares a potential $V_{N3}$ of a connection point N3 of the resistor R21 and the resistor R22, with a potential $V_{N4}$ of a connection point N4 of the resistor R23 and the resistor R24. $V_{N3}$ can be defined by Equation (9) as:

$$V_{N3} = V_{IN} - R21 \times Ic \qquad (9)$$

$V_{N4}$ can be represented by Equation (10) as:

$$V_{N4} = V_{IN} - I_{M1} \times Rs - R23 \times Ic \qquad (10)$$

An output of the comparator CMP1 becomes a high level when the $V_{N3} > V_{N4}$, or $I_{M1} > (R21-R23)/Rs \cdot Ic$, and becomes a low level when $V_{N3} < V_{N4}$, or $I_{M1} < (R21-R23)/Rs \cdot Ic$. The comparator CMP1 compares the current $I_{M1}$ flowing through the switching transistor M1 with a predetermined peak threshold level $I_{PEAK} = (R21-R23)/Rs \cdot Ic$, and outputs the OFF signal $S_{OFF}$ which is asserted when $I_{M1} > I_{PEAK}$. If R21=2R and R23=R, $I_{PEAK}=R/Rs \cdot Ic$ is obtained.

In FIG. 3, R21+R22 and R23+R2 are designed to have an equal value. With this configuration, a potential of the drain of the transistor M21 can be close to a potential of the drain of the transistor M22, and the current Ic flowing through the transistor M21 can be identical to the current Ic flowing through transistor M22. This is because the resistance value of the detection resistor Rs is so small that the potential of the CSP terminal can be considered as being identical to the potential of the CSN terminal, and a voltage drop across the resistors R21 and R22 becomes substantially identical to a voltage drop of the resistors R23 and R24.

Figure 4A:
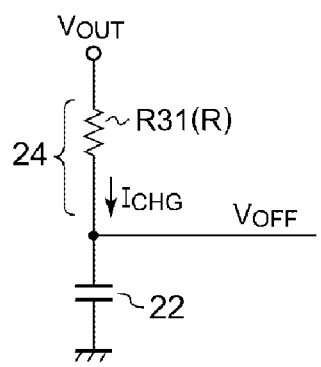
FIGS. 4A and 4B are circuit diagrams illustrating a configuration of a current source of the lighting apparatus shown in FIG. 1.
Figure 4B:
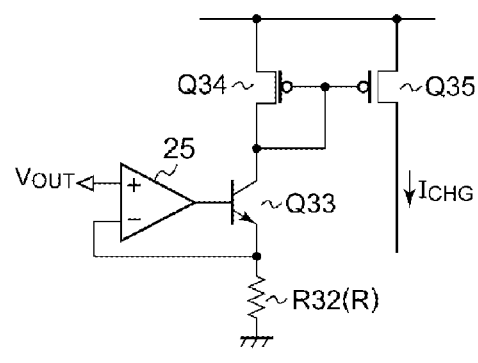

FIGS. 4A and 4b are circuit diagrams for showing an example of the configuration of the current source 24 in FIG. 1. Most simply, as shown in FIG. 4A, the current source 24 may be formed with a resistor 31 having a resistance value R. When $V_{OUT} > V_{OFF}$, the charging current $I_{CHG}$ flowing through the resistor R31 can be approximated by Equation (11).

$$I_{CHG} = V_{OUT}/R31 \qquad (11)$$

Therefore, by setting the resistance value of the resistor R31 to $R_X$, the charging current $I_{CHG} = V_{OUT}/R_X$ may be generated.

The current source 24 of FIG. 4B includes an operational amplifier 25, a resistor R32, and transistors Q33 to Q35. The transistor Q33 and the resistor R32 are stacked in series. An output of the operational amplifier 25 is connected with a control terminal (base or gate) of the transistor Q33. And, the output voltage $V_{OUT}$ is input to one input terminal of the amplifier 25 and a voltage drop across the resistor R32 is input to the other input terminal of the amplifier 25. A feedback is provided so that the voltage drop across the resistor R32 becomes equal to the output voltage $V_{OUT}$. Therefore, $I_{CHG} = V_{OUT}/R32$ flows through the transistor Q33 and the resistor R32. The transistors Q34 and Q35 form a current mirror circuit, thus supplying the current $I_{CHG}$ to the first capacitor 22. By setting the resistance value of the resistor R32 to R, the current $I_{CHG} = V_{OUT}/R$ may be generated.

Next, the operation of the DC/DC converter 6 will be described.

Figure 5:
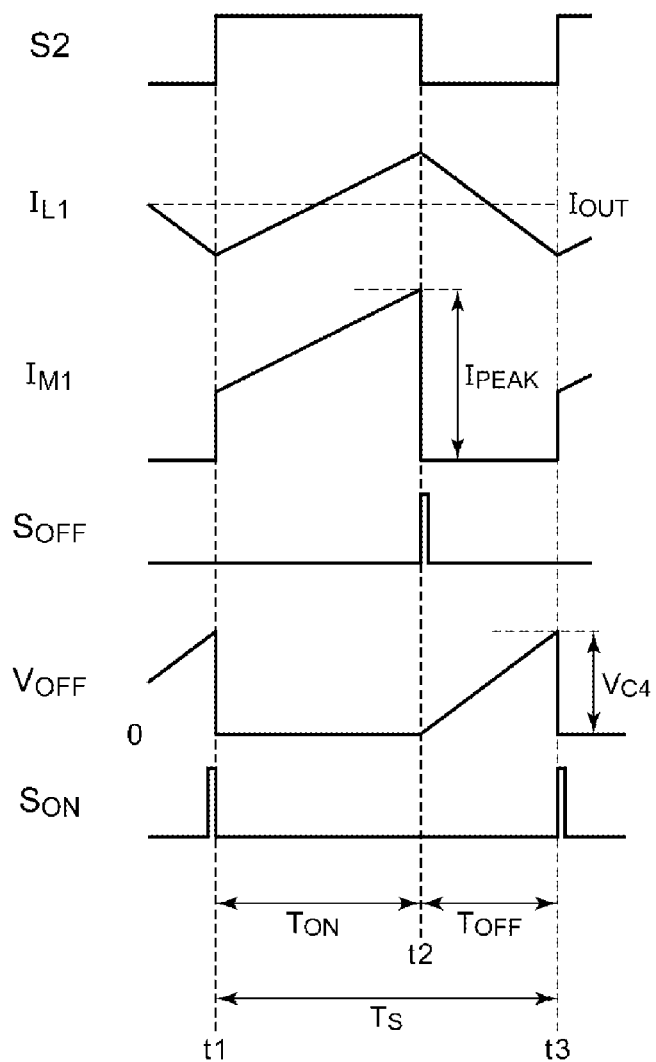
FIG. 5 is a waveform diagram showing an operation of a DC/DC converter, according to some embodiments.

FIG. 5 is a waveform diagram showing the operation of the DC/DC converter 6. From top to bottom, the pulse signal S2, the inductor current $I_{L1}$, the current $I_{M1}$ flowing through the switching transistor M1, the OFF signal $S_{OFF}$, the voltage $V_{OFF}$ of the second capacitor C2, and the ON signal $S_{ON}$ are shown. Delay of each comparator or driver has been ignored.

The pulse signal becomes a high level at time t1, and the switching transistor M1 is turned on. Thus, the inductor current $I_{L1}$ begins to increase until it reaches the peak current $I_{PEAK}$ at time t2. When the peak current $I_{PEAK}$ is reached at time t2, the OFF signal $S_{OFF}$ is asserted so that the pulse signal S2 becomes a low level and the switching transistor M1 is turned off. When the OFF signal $S_{OFF}$ is asserted, the first capacitor 22 is charged by the current $I_{CHG}$ from the current source 24. When the voltage $V_{OFF}$ of the first capacitor 22 reaches the threshold voltage $V_{C4}$ generated by the arithmetic circuit 50, the ON signal $S_{ON}$ is asserted. Thus, the pulse signal S2 becomes a high level again, and the switching transistor M1 is turned on.

The DC/DC converter 6 repeats this operation to stabilize the output current $I_{OUT}$ flowing through the light-emitting element 4.

At a steady state, the inductor current $I_{L1}$ fluctuates with having the output current $I_{OUT}$ as an average value. Where $\Delta I_{PP}$ is an amount of ripples of the inductor current $I_{L1}$, an off-time $T_{OFF}$, an on-time $T_{ON}$ and a switching cycle Ts are given by Equations (12) to (14), respectively:

$$T_{OFF} = \Delta_{IPP} \cdot L / V_{OUT} \qquad (12)$$

$$T_{ON} = \Delta_{IPP} \cdot L / (V_{IN} - V_{OUT}) \qquad (13)$$

$$T_S = \qquad (14)$$
$$T_{OFF} + T_{ON} = T_{OFF} \times \{1 + T_{ON}/T_{OFF}\} = T_{OFF} \times \{V_{IN}/(V_{IN} - V_{OUT})\}$$

As shown in FIG. 5, the off-time $T_{OFF}$ is a time taken from when the voltage $V_{OFF}$ of the first capacitor 22 is zero till when the voltage $V_{OFF}$ reaches the threshold voltage $V_{C4}$. As mentioned above, the voltage $V_{OFF}$ of the first capacitor 22 increases with time t according to Equation (2). In addition, the threshold voltage $V_{C4}$ is given by Equation (1) and the voltage $V_{OFF}$ is given by Equation (2):

$$V_{C4} = (V_{IN} - V_{OUT}) \times V_{OUT}/V_{IN} \times m \qquad (1)$$

$$V_{OFF} = I_{CHG}/C_X \times t = (V_{OUT}/R_X)/C_X \times t \qquad (2)$$

Therefore, the off-time $T_{OFF}$ is given by Equation (15):

$$T_{OFF} = V_{C4}/(V_{OUT}/R/C_X) = (V_{IN} - V_{OUT})/V_{IN} \times m \times R_X \times C_X \qquad (15)$$

By applying Equation (15) to Equation (14), Equation (16) is obtained.

$$T_S = (V_{IN} - V_{OUT})/V_{IN} \times m \times R_X \times C_X \times V_{IN}/(V_{IN} - V_{OUT}) = m \times R_X \times C_X \qquad (16)$$

As represented by Equation (16), the cycle $T_S$, has a constant value regardless of the input voltage $V_{IN}$ and the output voltage $V_{OUT}$.

In this way, the DC/DC converter 6 is enabled to maintain a switching cycle Ts having a constant value, irrespective of the input voltage $V_{IN}$ and the output voltage $V_{OUT}$. By maintaining the constant switching cycle $T_S$, electromagnetic interference (EMI) suppression becomes easy and the design of the lighting apparatus 2 may be simplified significantly. It is also possible to operate the DC/DC converter 6 in synchronization with a different circuit block.

It is possible to adjust the switching cycle $T_S$ of the DC/DC converter 6 depending on the constant in, $R_X$, $C_X$. This makes it possible to perform the EMI suppression more simply.

In the arithmetic circuit 50 in FIG. 2A, the output voltage VC3 of the multiplication circuit 54 fluctuates with certain ripples. Therefore, the threshold voltage $V_{C4}$ will have ripples corresponding to the voltage VC3. As represented by Equation (15), if the threshold voltage $V_{C4}$ fluctuates, the off-time $T_{OFF}$ will have a jitter component accordingly. Then, the switching cycle Ts will also have a jitter component. Therefore, a spectrum of switching of the DC/DC converter 6 may be spread, and a peak of the spectrum may be suppressed. This will be effective for the EMI suppression.

In addition, it is possible to adjust the amount of ripples of the threshold voltage $V_{C4}$ by providing the smoothing circuit 56 downstream of the multiplication circuit 54. If the ripple component of the voltage $V_{C3}$ is removed completely by the smoothing circuit 56, the ripple component of the threshold voltage $V_{C4}$ becomes zero. On the contrary, if the ripple component of the voltage $V_{C3}$ is passed by the smoothing circuit 56, the ripple component of the threshold voltage $V_{C4}$ becomes greater. Therefore, it is possible to control the ripple component of the threshold voltage $V_{C4}$ in corresponding to a cut-off frequency of the smoothing circuit 56. Accordingly, it becomes possible to control the spectrum of the DC/DC converter 6.

As above, the present disclosure has been described based on various embodiments that may be considered alone or in combination with one or more other embodiments or circuit components described herein. These embodiments are illustrative, and various modifications of each component, each process, and a combination thereof may be present. Such variations will be described below as additional examples, but they are not limiting as other variations may be possible.

The lighting apparatus 2 has been described as an application of the DC/DC converter 6. However, without any limitation in use, electronic devices or the like equipped with the light-emitting element 4 may also be the application of the DC/DC converter 6. In addition, a load of the DC/DC converter 6 is not limited to the light-emitting element 4, but any other load to be driven with constant current may be used.

In addition, the setting of high-level and low-level logic signals is an example. It will be appreciated that other settings may be utilized, for example, according to any appropriate inversion by an inverter or the like.

According to one aspect of the present disclosure, a load may be driven with constant current at a stable frequency.

While certain embodiments have been described, these embodiments have been presented by way of example only, and are not intended to limit the scope of the disclosures. Indeed, the novel methods and apparatuses described herein may be embodied in a variety of other forms; furthermore, various omissions, combinations, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A control circuit of a DC/DC converter, comprising:
    a current detection circuit configured to compare a current detection signal indicative of a current flowing through a switching transistor of the DC/DC converter with a predetermined threshold to generate an OFF signal that is asserted when the current flowing through the switching transistor reaches a predetermined peak current;
    a timer circuit configured to generate an ON signal that is asserted after a predetermined time period has elapsed since an assertion of the OFF signal;
    a pulse generation circuit configured to generate a pulse signal that transitions to a first-level when the ON signal is asserted, and transitions to a second-level when the OFF signal is asserted; and
    a driver configured to drive the switching transistor based on the pulse signal,
    wherein the timer circuit includes:
        a first capacitor, one electrode of the first capacitor having a fixed potential;
        a current source configured to generate a charging current based on an output voltage $V_{OUT}$ of the DC/DC converter so as to charge the first capacitor with the charging current;
        an arithmetic circuit configured to generate a threshold voltage $V_{C4}$ according to an equation of:
        $V_{C4}=(V_{IN}-V_{OUT})\times V_{OUT}/V_{IN}\times m$ wherein $V_{IN}$ is an input voltage of the DC/DC converter, $V_{OUT}$ is an output voltage of the DC/DC converter, and m is a constant; and
        a first comparator configured to compare a voltage of the first capacitor and the threshold voltage $V_{C4}$ so as to generate the ON signal that is asserted when the voltage of the first capacitor reaches the threshold voltage $V_{C4}$.

2. The control circuit of claim 1, wherein the arithmetic circuit includes:
    a division circuit configured to divide a voltage $(V_{IN}-V_{OUT})/k$ corresponding to a difference between the input voltage $V_{IN}$ and the output voltage $V_{OUT}$ by a voltage $V_{IN}/k$ corresponding to the input voltage $V_{IN}$, wherein k is a constant; and
    a multiplication circuit configured to multiply an output voltage of the division circuit and a voltage $V_{OUT}\cdot m$ corresponding to the output voltage $V_{OUT}$.

3. The control circuit of claim 2, wherein the division circuit includes:
    a first input terminal configured to receive the voltage $(V_{IN}-V_{OUT})/k$ corresponding to the difference between the input voltage $V_{IN}$ and the output voltage $V_{OUT}$;
    a second input terminal configured to receive the voltage $V_{IN}/k$ corresponding to the input voltage $V_{IN}$;
    a second capacitor, a first electrode of the second capacitor being grounded;
    a first transistor and a second transistor connected in series between the second input terminal and a ground terminal, the first transistor being a P-channel MOSFET (Metal Oxide Semiconductor Field Effect Transistor) and the second transistor being an N-channel MOSFET;
    a second resistor arranged between a connection point of the first transistor and the second transistor and a second electrode of the second capacitor; and
    a second comparator, an inverting input terminal of the second comparator being connected to the first input terminal, a non-inverting input terminal of the second comparator being connected to the second electrode of the second capacitor and an output terminal of the second comparator being connected to a gate of the first transistor and a gate of the second transistor, and
    wherein the multiplication circuit includes:
    a third input terminal configured to receive a voltage of the output terminal of the second comparator of the division circuit;
    a fourth input terminal configured to receive a voltage corresponding to the output voltage $V_{OUT}$;
    a third transistor and a fourth transistor connected in series between the fourth input terminal and the ground terminal, the third transistor being a P-channel FET, the fourth transistor being an N-channel FET, a gate of the third transistor being connected to the third input terminal, and a gate of the fourth transistor being connected to the third input terminal;

a third capacitor, a first electrode of the third capacitor being grounded; and a third resistor disposed between a connection point of the third transistor and the fourth transistor and the second electrode of the third capacitor.

4. The control circuit of claim 3, wherein the arithmetic circuit further includes a smoothing circuit configured to smooth a voltage of a second electrode of the third capacitor of the multiplication circuit.

5. The control circuit of claim 3, wherein the arithmetic circuit further includes:

a first reset terminal to which a first initialization voltage $(V_{IN}-V_{O\_NOM})/k$ corresponding to a difference between the input voltage $V_{IN}$ and a target output voltage $V_{O\_NOM}$ is input; and a first reset transistor disposed between, the first reset terminal and the second electrode of the second capacitor.

6. The control circuit of claim 3, wherein the arithmetic circuit further includes:

a second reset terminal to which a second initialization voltage is input; and a second reset transistor disposed between the second reset terminal and the second electrode of the third capacitor.

7. The control circuit of claim 6, wherein the arithmetic circuit further includes a smoothing circuit configured to smooth a voltage of the second electrode of the third capacitor of the multiplication circuit, and wherein the smoothing circuit includes:

a fourth capacitor, a first electrode of the fourth capacitor being grounded; and a third reset transistor disposed between a second electrode of the fourth capacitor and the second reset terminal.

8. The control circuit of claim 1, wherein the current source includes a resistor, one end of the resistor being connected to the first capacitor, and the output voltage $V_{OUT}$ being applied to the other end of the resistor.

9. A DC/DC converter comprising the control circuit of claim 1.

10. A lighting apparatus, comprising;

a light-emitting element; and the DC/DC converter of claim 9.

* * * * *